US012637804B2

(12) United States Patent
Aoki et al.

(10) Patent No.: US 12,637,804 B2
(45) Date of Patent: May 26, 2026

(54) INK JET RECORDING METHOD

(71) Applicant: SEIKO EPSON CORPORATION,
Tokyo (JP)

(72) Inventors: Kazuto Aoki, Shiojiri (JP); Haruka Sato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 79 days.

(21) Appl. No.: 18/407,737

(22) Filed: Jan. 9, 2024

(65) Prior Publication Data

US 2024/0229350 A1     Jul. 11, 2024

(30) Foreign Application Priority Data

Jan. 10, 2023     (JP) ................................. 2023-001650

(51) Int. Cl.
*B41J 3/407* (2006.01)
*B41M 3/00* (2006.01)
(Continued)

(52) U.S. Cl.
CPC .............. *D06P 5/30* (2013.01); *B41J 3/4078* (2013.01); *B41M 3/001* (2013.01);
(Continued)

(58) Field of Classification Search
CPC ...... D06P 5/30; D06P 1/5285; D06P 1/67375; D06P 5/22; D06P 3/60; D06P 1/44;
(Continued)

(56) References Cited

U.S. PATENT DOCUMENTS

2004/0102113 A1* 5/2004 DeMott .................... B60N 2/58
442/154
2009/0185019 A1* 7/2009 Ogasawara ............ C09D 11/30
347/100
(Continued)

FOREIGN PATENT DOCUMENTS

CN         114845881 A  *  8/2022  ............. C09D 11/54
JP         2017-186455 A     10/2017
(Continued)

*Primary Examiner* — Yaovi M Ameh
(74) *Attorney, Agent, or Firm* — Harness, Dickey & Pierce, P.L.C.

(57) ABSTRACT

An ink jet recording method according to an embodiment of the present disclosure includes a reaction liquid attachment step of attaching a reaction liquid to a fabric and an ink attachment step of attaching a white ink composition to the fabric with the attached reaction liquid, wherein the reaction liquid contains one or more selected from a polyvalent metal salt, a cationic polymer, and an organic acid as an aggregation agent, the white ink composition contains one or both of a white pigment and a resin particle, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, the same main scanning is performed a plurality of times with respect to the same scanning region, and (amount of attachment in first pass)>(amount of attachment in nth pass)

(amount of attachment in first pass)+(amount of attachment in nth pass)≥20 mg/inch$^2$, where a total amount of attachment per unit area of the reaction liquid and the white ink composition that are (Continued)

attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

10 Claims, 1 Drawing Sheet

(51) Int. Cl.

| | | |
|---|---|---|
| *B41M 5/00* | (2006.01) | |
| *C09D 11/037* | (2014.01) | |
| *C09D 11/102* | (2014.01) | |
| *C09D 11/322* | (2014.01) | |
| *C09D 11/38* | (2014.01) | |
| *C09D 11/54* | (2014.01) | |
| *D06P 1/52* | (2006.01) | |
| *D06P 1/673* | (2006.01) | |
| *D06P 5/22* | (2006.01) | |
| *D06P 5/30* | (2006.01) | |
| *D06P 1/44* | (2006.01) | |
| *D06P 3/60* | (2006.01) | |
| *D06P 5/00* | (2006.01) | |

(52) U.S. Cl.
CPC ........ *B41M 5/0017* (2013.01); *B41M 5/0047* (2013.01); *C09D 11/037* (2013.01); *C09D 11/102* (2013.01); *C09D 11/322* (2013.01); *C09D 11/38* (2013.01); *C09D 11/54* (2013.01); *D06P 1/5285* (2013.01); *D06P 1/67375* (2013.01); *D06P 5/22* (2013.01); *B41M 5/0023* (2013.01); *D06P 1/44* (2013.01); *D06P 3/60* (2013.01); *D06P 5/002* (2013.01)

(58) Field of Classification Search
CPC ....... D06P 5/002; B41J 3/4078; B41M 3/001; B41M 5/0047; B41M 5/0017; B41M 5/0023; C09D 11/037; C09D 11/102; C09D 11/322; C09D 11/38; C09D 11/54
See application file for complete search history.

(56) References Cited

U.S. PATENT DOCUMENTS

| | | | | |
|---|---|---|---|---|
| 2011/0292111 | A1* | 12/2011 | Puigardeu | .............. B41J 2/2135 |
| | | | | 347/14 |
| 2017/0292035 | A1* | 10/2017 | Saito | .................... D06P 1/5285 |
| 2022/0282107 | A1 | 9/2022 | Ozaki et al. | |

FOREIGN PATENT DOCUMENTS

| | | |
|---|---|---|
| JP | 2022-134095 A | 9/2022 |
| JP | 2022-162288 A | 10/2022 |

* cited by examiner

INK JET RECORDING METHOD

The present application is based on, and claims priority from JP Application Serial Number 2023-001650, filed Jan. 10, 2023, the disclosure of which is hereby incorporated by reference herein in its entirety.

BACKGROUND

1. Technical Field

The present disclosure relates to an ink jet recording method.

2. Related Art

In the related art, fabrics are dyed (textile-printed) by using an ink jet recording method, and a technology to apply pretreatment to a fabric by using a reaction liquid for aggregating or thickening an ink component is known.

For example, JP-A-2017-186455 describes a textile-printing method in which, after a treatment liquid composition is applied to a fabric, pressure fixing by heat press is performed, and a white ink composition is attached, by an ink jet method, to the fabric subjected to pressure fixing.

Pressure fixing being performed may suppress a fabric from fluffing, but there is a problem that a process is complicated. However, it is difficult to favorably suppress fluffing without performing pressure fixing. In addition, deterioration in image quality (degree of whiteness) due to fluffing occurs. Therefore, it is desired to favorably suppress fluffing and to obtain favorable image quality (degree of whiteness).

SUMMARY

An aspect of an ink jet recording method according to the present disclosure includes a reaction liquid attachment step of attaching a reaction liquid to a fabric and an ink attachment step of attaching a white ink composition to the fabric with the attached reaction liquid, wherein the reaction liquid contains one or more selected from a polyvalent metal salt, a cationic polymer, and an organic acid as an aggregation agent, the white ink composition contains one or both of a white pigment and a resin particle, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, the same main scanning is performed a plurality of times with respect to the same scanning region, and (amount of attachment in first pass)>(amount of attachment in nth pass)

(amount of attachment in first pass)+(amount of attachment in nth pass)≥20 mg/inch$^2$, where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

DESCRIPTION OF EMBODIMENTS

Figure 1:
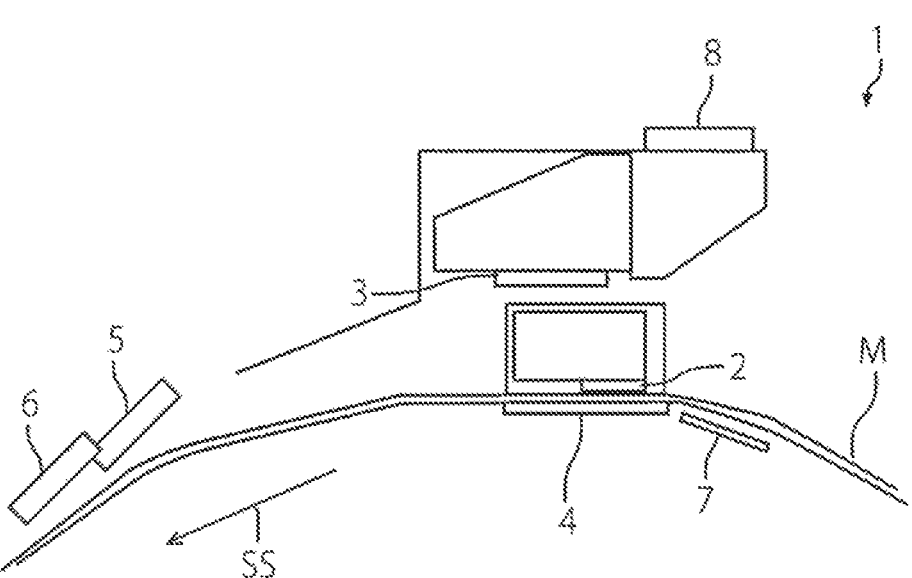
FIG. 1 is a schematic diagram illustrating an example of an ink jet recording apparatus.

Embodiments according to the present disclosure will be described below. The embodiments described below explain examples of the present disclosure. The present disclosure is not limited to the following embodiments and includes various modified embodiments performed within the bounds of not changing the scope of the present disclosure. In this regard, all configurations described below are not limited to being configurations indispensable to the present disclosure.

1. Ink Jet Recording Method

An ink jet recording method according to an embodiment of the present disclosure includes a reaction liquid attachment step of attaching a reaction liquid to a fabric and an ink attachment step of attaching a white ink composition to the fabric with the attached reaction liquid, wherein the reaction liquid contains one or more selected from a polyvalent metal salt, a cationic polymer, and an organic acid as an aggregation agent, the white ink composition contains one or both of a white pigment and a resin particle, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, the same main scanning is performed a plurality of times with respect to the same scanning region, and (amount of attachment in first pass)>(amount of attachment in nth pass)

(amount of attachment in first pass)+(amount of attachment in nth pass)≥20 mg/inch$^2$, where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

Pressure fixing being performed may suppress a fabric from fluffing, but there is a problem that a process is complicated. However, it is difficult to favorably suppress fluffing without performing pressure fixing. In addition, fluff moves due to swelling, shrinkage, or the like caused by water absorption from the instant the fluff is wet with an ink or a reaction liquid. When the fluff moves, the landing position of the ink is shifted, shielding of the color of the fabric itself becomes insufficient, and deterioration in the image quality (degree of whiteness) occurs.

On the other hand, according to the ink jet recording method of the present embodiment, since the reaction liquid and the white ink composition are attached by the same main scanning, a reaction between the two occurs immediately after the liquid is attached to the fabric, and the amount of attachment in the first pass is large, a sufficient amount of the liquid having enhanced viscosity after the reaction can be attached before the fluff moves to a great extent. Consequently, fluffing can be favorably suppressed and favorable image quality (degree of whiteness) can be obtained.

Each steps included in the ink jet recording method according to the present embodiment will be described below.

1.1 Reaction Liquid Attachment Step

The ink jet recording method according to the present embodiment includes the reaction liquid attachment step of attaching the reaction liquid to the fabric.

1.1.1 Attachment Mode

Ink Jet Method

In the ink jet recording method according to the present embodiment, the reaction liquid attachment step and the ink attachment step described later are performed by the ink jet method. The ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, and the same main scanning is performed a plurality of times with respect to the same scanning region.

"Ink jet method" is a recording method for ejecting a liquid droplet such as an ink from a nozzle of an ink jet head included in an ink jet recording apparatus or the like so as to apply the liquid droplet to a recording medium.

Figure 2:
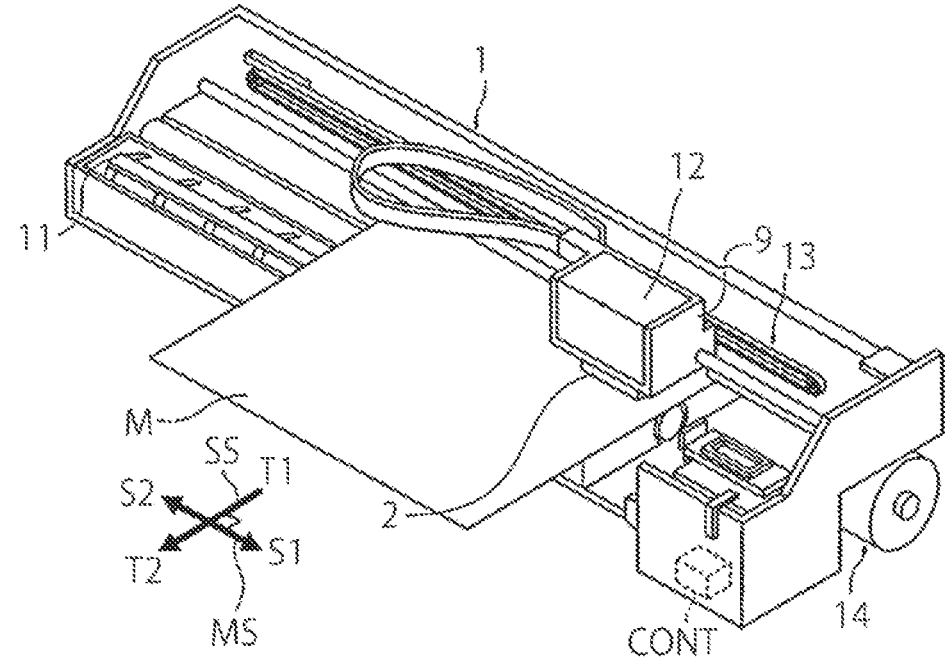
FIG. 2 is a schematic diagram illustrating around a carriage of an example of an ink jet recording apparatus.

"The ink jet method performs main scanning a plurality of times, the main scanning performing recording by moving an ink jet head in a direction perpendicular to a transport direction of the fabric" denotes that, for example, in the ink jet recording apparatus described later as illustrated in FIG. 1 and FIG. 2, scanning to perform recording while a carriage 9 including an ink jet head 2 is moved in the direction (main scanning direction MS) perpendicular to the transport direction (sub-scanning direction SS) of the fabric M is performed a plurality of times.

When "the reaction liquid and the white ink composition are attached to the same scanning region of the fabric by the same main scanning" is performed, on the fabric, a liquid droplet of the reaction liquid can be immediately brought into contact with a liquid droplet of the white ink substantially without being dried.

Consequently, the reaction between the two can be started immediately after the liquid is attached to the fabric, and the liquid having enhanced viscosity after the reaction can be attached before fluff moves to a great extent. Regarding attachment in such a mode, for example, the nozzle surface, not illustrated in the drawing, of an ink jet head 2 may include a plurality of nozzle lines in which a plurality of nozzles are aligned in the sub-scanning direction SS are included in the main scanning direction MS, the plurality of nozzle lines may be arranged so that at least a portion of the nozzle lines overlap each other when being projected in the main scanning direction MS, and the reaction liquid and the white ink composition can be ejected on a nozzle basis. Consequently, the reaction liquid and the white ink composition can be ejected and attached to the same position (the same scanning region) in the sub-scanning direction of the fabric by the same main scanning.

When "the same main scanning is performed a plurality of times with respect to the same scanning region", the main scanning for attaching the reaction liquid and the white ink composition passes a plurality of times above the same region of the fabric. The number of times of scanning being increased enables the reaction liquid and the ink to be attached to the predetermined region in a plurality of times (in a plurality of passes), and the image quality of the resulting recorded material tends to be further improved.

In this regard, when an optional region is recorded, the number of times of the ink jet head passing above the region is also referred to as "pass". For example, when the main scanning above the same region for attaching the white ink composition and the reaction liquid is performed 4 times, the number of passes is referred to as "4 passes" and the like. For example, when the length of a single time of sub-scanning in the sub-scanning direction SS is a quarter of the length of the nozzle line in the sub-scanning direction SS, scanning in the sub-scanning direction SS is performed 4 times with respect to a rectangular scanning region that has the length of a single time of sub-scanning and that extends in the main scanning direction MS. The number of times of scanning from such a viewpoint is referred to as "scanning number", "pass number", or the like. The number of times of scanning is 2 or more, preferably 4 or more, and more preferably 8 or more. In addition, the number of times of scanning is preferably 20 or less, more preferably 15 or less, further preferably 13 or less, and particularly preferably 10 or less.

Concerning Amount of Attachment

In the ink jet recording method according to the present embodiment, $$\text{(amount of attachment in first pass)} > \tag{1}$$
$$\text{(amount of attachment in } n\text{th pass)}$$
$$\text{(amount of attachment in first pass)} + \tag{2}$$
$$\text{(amount of attachment in } n\text{th pass)} \geq 20 \text{ mg/inch}^2,$$

where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

When Relational formulae (1) and (2) above are satisfied, immediately after the fluff is wetted with the ink and the reaction liquid, a sufficient amount of the liquid having enhanced viscosity after the reaction can be attached to the fabric. Consequently, fluffing can be favorably suppressed, and favorable image quality (degree of whiteness) can be obtained.

In Relational formula (1), the amount of attachment in the first pass is preferably 1.2 times or more the amount of attachment in the nth pass, more preferably 1.4 times or more, further preferably 1.6 times or more, particularly preferably 1.8 times or more, and more particularly preferably 2.0 times or more. Consequently, fluffing can be more favorably suppressed, and more favorable image quality (degree of whiteness) tends to be obtained. There is no particular limitation regarding the upper limit, and the amount of attachment in the first pass may be 10 times or less the amount of attachment in the nth pass, may be 8 times or less, may be 6 times or less, may be 4 times or less, and may be 3 times or less.

In Relational formula (2), the total amount of the amount of attachment in the first pass and the amount of attachment in the nth pass is preferably 22 $mg/inch^2$ or more, more preferably 24 $mg/inch^2$ or more, further preferably 26 $mg/inch^2$ or more, particularly preferably 28 $mg/inch^2$ or more, and more particularly preferably 30 $mg/inch^2$ or more. Consequently, fluffing can be more favorably suppressed, and more favorable image quality (degree of whiteness) tends to be obtained. There is no particular limitation regarding the upper limit, and the total amount may be 50 $mg/inch^2$ or less, may be 40 $mg/inch^2$ or less, and may be 35 $mg/inch^2$ or less.

The amount of attachment in the first pass is preferably 10 $mg/inch^2$ or more, more preferably more than 10 $mg/inch^2$, further preferably 12 $mg/inch^2$ or more, still further preferably 14 $mg/inch^2$ or more, particularly preferably 16 $mg/inch^2$ or more, more particularly preferably 18 $mg/inch^2$ or more, and especially preferably 20 $mg/inch^2$ or more. When the amount of attachment in the first pass is within the above-described range, fluffing can be more favorably suppressed, and more favorable image quality (degree of whiteness) tends to be obtained. There is no particular limitation regarding the upper limit of the amount of attachment in the first pass, and the upper limit may be 50 $mg/inch^2$ or less, may be 40 $mg/inch^2$ or less, may be 30 $mg/inch^2$ or less, and may be 25 $mg/inch^2$ or less.

In addition, the amount of attachment in the nth pass is preferably less than 20 $mg/inch^2$, more preferably less than 18 $mg/inch^2$, further preferably less than 16 $mg/inch^2$, still further preferably less than 14 $mg/inch^2$, particularly preferably less than 12 $mg/inch^2$, and more particularly preferably 10 $mg/inch^2$ or less. When the amount of attachment in the nth pass is within the above-described range, fluffing can be more favorably suppressed, and more favorable image quality (degree of whiteness) tends to be obtained. There is no particular limitation regarding the lower limit of the amount of attachment in the nth pass, and the lower limit may be 2 $mg/inch^2$ or more, may be 4 $mg/inch^2$ or more, may be 6 $mg/inch^2$ or more, and may be 8 $mg/inch^2$ or more.

Regarding the amount of attachment in the first pass and the amount of attachment in the nth pass, the ratio of the amount of attachment per unit area of the white ink composition to the amount of attachment per unit area of the reaction liquid is preferably from 0.5 to 1.5, more preferably from 0.7 to 1.3, and further preferably from 0.9 to 1.1.

The total amount of attachment (total amount of ejections) per unit area of the reaction liquid and the white ink composition that are attached to the fabric by the first main scanning to the nth main scanning (n is an integer of 2 or more) with respect to the same scanning region is preferably 80 $mg/inch^2$ or more, more preferably 90 $mg/inch^2$ or more, and further preferably 100 $mg/inch^2$ or more. There is no particular limitation regarding the upper limit of the total amount of ejections, and the upper limit may be 150 $mg/inch^2$ or less, may be 130 $mg/inch^2$ or less, and may be 110 $mg/inch^2$ or less.

Difference in Liquid Droplet Landing Time

In the ink jet recording method according to the present embodiment, a difference in landing time between the reaction liquid and the white ink composition attached to the same scanning region by the same main scanning is preferably within 3.0 sec, more preferably within 2.0 sec, further preferably within 1.0 sec, particularly preferably within 0.5 sec, and more particularly preferably within 0.3 sec. The difference in landing time being within the above-described range enables the liquid having enhanced viscosity after the reaction to be attached, more immediately after the fabric is wetted with the ink and the reaction liquid, before fluff moves to a great extent. Consequently, fluffing can be more favorably suppressed, and more favorable image quality (degree of whiteness) tends to be obtained.

In this regard, "difference in landing time between the reaction liquid and the white ink composition attached to the same scanning region by the same main scanning" denotes a difference between the time at which the reaction liquid is attached to a predetermined region of the fabric and the time at which the white ink composition is attached to the predetermined region when the reaction liquid and the white ink composition are attached to the same scanning region of the fabric by the same main scanning.

1.1.2 Reaction Liquid

The reaction liquid contains one or more selected from a polyvalent metal salt, a cationic polymer, and an organic acid as an aggregation agent.

Each component contained in the reaction liquid will be described below.

Aggregation Agent

The reaction liquid contains one or more selected from a polyvalent metal salt, a cationic polymer, and an organic acid as an aggregation agent. The aggregation agent has a function of acting on the dispersibility of a component such as a white pigment, a resin particle, and the like that may be contained in the white ink composition so as to aggregate at least one of these components. The degree of aggregation of the dispersion due to the aggregation agent changes in accordance with the type of each of the aggregation agent and the object and can be controlled. For example, the color developability of an image and the fixability of an image can be enhanced by such aggregation action.

The polyvalent metal salt is a compound composed of a divalent or higher metal ion and an anion. Examples of the divalent or higher metal ion include ions of calcium, magnesium, copper, nickel, zinc, barium, aluminum, titanium, strontium, chromium, cobalt, iron, and the like. Of metal ions constituting the polyvalent metal salts, one or both of a calcium ion and a magnesium ion may be adopted from the viewpoint of excellent aggregation property with respect to the ink component.

The anion constituting the polyvalent metal salt is an inorganic ion or an organic ion. That is, the polyvalent metal salt according to the present disclosure is composed of an inorganic ion or an organic ion and a polyvalent metal. Examples of such an inorganic ion include a chlorine ion, a bromine ion, an iodine ion, a formic acid ion, a nitric acid ion, a sulfonic acid ion, and a hydroxide ion. Examples of the organic ion include organic acid ions such as a carboxylic acid ion.

Specific examples of the polyvalent metal salt include calcium carbonate such as ground calcium carbonate and precipitated calcium carbonate, calcium formate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, and aluminum lactate. Only one type of the polyvalent metal salts may be used, or two or more types thereof may be used in combination. Of these, at least one of magnesium sulfate, calcium formate, calcium nitrate, aluminum lactate, and calcium propionate may be adopted from the viewpoint of obtaining sufficient solubility in water. In this regard, these metal salts may have hydrated water in a state of a raw material.

Examples of the cationic polymer (cationic resin) include cationic urethane-based resins, cationic olefin-based resins, cationic amine-based resins, and cationic surfactants.

Regarding the cationic urethane-based resin, commercially available products can be used. For example, HYDRAN CP-7010, CP-7020, CP-7030, CP-7040, CP-7050, CP-7060, and CP-7610 (trade names, produced by DAINIPPON INK AND CHEMICALS, INCORPORATED), SUPERFLEX 600, 610, 620, 630, 640, and 650 (trade names, produced by Dai-ichi Kogyo Seiyaku Co., Ltd.), and Urethane Emulsion WBR-2120C and WBR-2122C (trade names, produced by Taisei Fine Chemical Co., Ltd.) can be used.

The cationic olefin-based resin includes an olefin such as ethylene, propylene, or the like in a skeleton structure, and a known resin can be appropriately selected and used. In this regard, the cationic olefin-based resin may be in an emulsion state of being dispersed in a solvent containing water, an organic solvent, or the like. Regarding the cationic olefin-based resin, commercially available products can be used, and examples include Arrowbase CB-1200 and CD-1200 (trade names produced by UNITIKA LTD.).

It is sufficient that the cationic amine-based resin has an amino group in a structure, and a known resin can be appropriately selected and used. Examples include polyamine resins, polyamide resins, and polyallylamine resins. The polyamine resin is a resin having an amino group in a main skeleton of the resin. The polyamide resin is a resin having an amido group in a main skeleton of the resin. The polyallylamine resin is a resin having a structure derived from an allyl group in a main skeleton of the resin.

Examples of the cationic polyamine-based resin may include UNISENCE KHE103L (hexamethylenediamine/epichlorohydrin resin, pH of 1% aqueous solution of substantially 5.0, viscosity of from 20 to 50 (mPa·s), aqueous solution having a solid content of 50% by mass) and UNISENCE KHE104L (dimethylamine/epichlorohydrin resin, pH of 1% aqueous solution of substantially 7.0, viscosity of from 1 to 10 (mPa·s), aqueous solution having a solid content of 20% by mass) produced by SENKA corporation. Further, specific examples of the commercially available cationic polyamine-based resin include FL-14 (produced by SNF), ARAFIX 100, 251S, 255, and 255LOX (produced by ARAKAWA CHEMICAL INDUSTRIES LTD.), DK-6810, 6853, and 6885; WS-4010, 4011, 4020, 4024, 4027, and 4030 (produced by SEIKO PMC CORPORATION), PAPYOGEN P-105 (produced by SENKA corporation), Sumirez Resin 650(30), 675A, 6615, and SLX-1 (produced by Taoka Chemical Co., Ltd.), Catiomaster (registered trademark) PD-1, 7, 30, A, PDT-2, PE-10, PE-30, DT-EH, EPA-SK01, and TMHMDA-E (produced by Yokkaich Chemical Company Limited), and JETFIX 36N, 38A, and 5052 (produced by Satoda Chemical Industrial Co., Ltd.).

Examples of the polyallylamine resin include polyallylamine chloric acid salts, polyallylamineamide sulfuric acid salts, allylamine chloric acid salt-diallylamine chloric acid salt copolymers, allylamine acetic acid salt-diallylamine acetic acid salt copolymers, allylamine chloric acid salt-dimethylallylamine chloric acid salt copolymers, allylamine-dimethylallylamine copolymers, polydiallylamine chloric acid salts, polymethyldiallylamine chloric acid salts, polymethyldiallylamineamide chloric acid salts, polymethyldiallylamine acetic acid salts, polydiallyldimethylammonium chlorides, diallylamine acetic acid salt-sulfur dioxide copolymers, diallylmethylethylammoniumethyl sulfate-sulfur dioxide copolymers, methyldiallylamine chloric acid salt-sulfur dioxide copolymers, diallyldimethylammonium chloride-sulfur dioxide copolymers, and diallyldimethylammonium chloride-acrylamide copolymers.

Favorable examples of the organic acids include poly (meth)acrylic acids, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidonecarboxylic acid, pyronecarboxylic acid, pyrrolecarboxylic acid, furanecarboxylic acid, pyridinecarboxylic acid, coumalic acid, thiophenecarboxylic acid, nicotinic acid, and derivatives of these compounds and salts of these. Only one type of the organic acids may be used, or two or more types thereof may be used in combination. In this regard, organic acid salts that are also metal salts are included in the above-described metal salts.

In the present specification, "(meth)acrylic" represents acrylic or methacrylic, and "(meth)acrylate" represents acrylate or methacrylate.

Only one type of the aggregation agents may be used, or two or more types thereof may be used in combination.

The lower limit of the content of the aggregation agent is, for example, preferably 1% by mass or more relative to the total mass of the reaction liquid, more preferably 2% by mass or more, further preferably 3% by mass or more, particularly preferably 4% by mass or more, and more particularly preferably 5% by mass or more. In addition, the upper limit of the content of the aggregation agent is, for example, preferably 15% by mass or less relative to the total mass of the reaction liquid, more preferably 10% by mass or less, further preferably 8% by mass or less, particularly preferably 7% by mass or less, and more particularly preferably 6% by mass or less.

Surfactant

The reaction liquid may contain a surfactant. The surfactant can be used for decreasing the surface tension of the reaction liquid to, for example, adjust and improve the permeability into the fabric. Any one of a nonionic surfactant, an anionic surfactant, a cationic surfactant, and an amphoteric surfactant can be used as the surfactant, and these may be used in combination. Of the surfactants, an acetylene-based surfactant (acetylene-glycol-based surfactant), a silicon-based surfactant, and a fluorine-based surfactant can be more favorably used, and a silicon-based surfactant and an acetylene-based surfactant can be further favorably used.

There is no particular limitation regarding the acetylene-based surfactant (acetylene-glycol-based surfactant), and examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, produced by Air Products and Chemicals, Inc.), OLFIN B, Y, P, A, STG, SPC, E1004, E1010, PD-001, PD-002W, PD-003, PD-004, PD-005, EXP. 4001, EXP. 4036, EXP. 4051, EXP. 4123, EXP. 4200, EXP. 4300, AF-103, AF-104, AK-02, SK-14, and AE-3 (trade names, produced by Nissin Chemical Industry Co., Ltd.), and Acetylenol E00, E00P, E40, and E100 (trade names, produced by Kawaken Fine Chemicals Co., Ltd.).

There is no particular limitation regarding the silicon-based surfactant, and favorable examples include polysiloxane-based compounds. There is no particular limitation regarding the polysiloxane-based compound, and favorable examples include polyether-modified organosiloxanes. Examples of the commercially available polyether-modified organosiloxane include BYK-306, BYK-307, BYK-333, BYK-341, BYK-345, BYK-346, and BYK-348 (trade names, produced by BYK), KF-351A, KF-352A, KF-353, KF-354L, KF-355A, KF-615A, KF-945, KF-640, KF-642, KF-643, KF-6020, X-22-4515, KF-6004, KF-6011, KF-6012, KF-6015, and KF-6017 (trade names, produced by Shin-Etsu Chemical Co., Ltd.).

Fluorine-modified polymers may be used as the fluorine-based surfactant, and specific examples include BYK-340 (trade name, produced by BYK Japan KK).

Only one type of the surfactants may be used, or two or more types thereof may be used in combination.

In the ink jet recording method according to the present embodiment, the reaction liquid may further contain a surfactant having an HLB value of 10 or more. Of the above-described surfactants, the surfactant having an HLB value of 10 or more can favorably adjust the permeability of the reaction liquid into the fabric, and the reaction liquid tends to more readily remain in the surface vicinity of the fabric. Consequently, since the reactivity with the ink is further improved, fluffing can be more favorably suppressed, and more favorable image quality (degree of whiteness) tends to be obtained.

In the present specification, "HLB" (value of hydrophile and liophile balance) numerically indicates the hydrophile and liophile balance of a compound. In this regard, the HLB value can be a value calculated by the Griffin method and can be determined based on Formula (3) below.

$$HLB \text{ value} = 20 \times \text{total formula weight of hydrophilic portion/molecular weight} \quad (3)$$

Specific examples of the surfactant having an HLB value by the Griffin method of 10 or more will be described below.

Examples of the acetylene-based surfactant (acetylene-glycol-based surfactant) having an HLB value of 10 or more include OLFIN E1010 (HLB value of 12), E1020 (HLB value of from 15 to 16), EXP. 4200 (HLB value of from 10 to 13), and EXP. 4123 (HLB value of from 10 to 13) (trade names, produced by Nissin Chemical Industry Co., Ltd.).

Examples of the silicon-based surfactant having an HLB value of 10 or more include BYK-348 (HLB value of 11) (trade name, produced by BYK), KF-6011 (HLB value of 14.5), KF-6013 (HLB value of 10), KF-6043 (HLB value of 14.5), KF-643 (HLB value of 14), KF-640 (HLB value of 14), KF-351A (HLB value of 12), and KF-354L (HLB value of 16) (trade names, produced by Shin-Etsu Chemical Co., Ltd.), FZ-2105 (HLB value of 11), L-7604 (HLB value of 13), and FZ-2104 (HLB value of 14) (trade names, produced by Dow Corning Toray Co., Ltd.), and SILWET L-7604 (HLB value of 13), SILWET L-7607N (HLB value of 17), SILWET FZ-2104 (HLB value of 14), and SILWET FZ-2161 (HLB value of 20) (trade names, produced by Nippon Unicar Company Limited).

The surfactant having an HLB value of 10 or more is more favorably a silicon-based surfactant or an acetylene-based surfactant and further favorably a silicon-based surfactant. When such a surfactant is contained, the permeability of the reaction liquid into the fabric can be more favorably adjusted, the reaction liquid tends to more readily remain in the surface vicinity of the fabric. Consequently, since the reactivity with the ink is further improved, fluffing can be more favorably suppressed, and more favorable image quality (degree of whiteness) tends to be obtained.

The lower limit of the content of the surfactant is preferably 0.1% by mass or more relative to the total mass of the reaction liquid, more preferably 0.2% by mass or more, further preferably 0.3% by mass or more, and particularly preferably 0.4% by mass or more. In addition, the upper limit of the content of the surfactant is preferably 3% by mass or less relative to the total mass of the reaction liquid, more preferably 2% by mass or less, further preferably 1% by mass or less, particularly preferably 0.8% by mass or less, and more particularly preferably 0.6% by mass or less. When the content of the surfactant is within the above-described range, the permeability of the reaction liquid into the fabric tends to be favorably adjusted.

Organic Solvent

The reaction liquid may contain an organic solvent. Examples of the organic solvent include esters, alkylene glycol ethers, cyclic esters, amides, alcohols, and polyhydric alcohols.

Examples of the ester include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, and dipropylene glycol acetate propionate.

It is sufficient that the alkylene glycol ether is a monoether or a diether of an alkylene glycol, and an alkyl ether may be adopted. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of the cyclic ester include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds in which hydrogen of a methylene group adjacent to a carbonyl group of these is substituted with an alkyl group having a carbon number of 1 to 4.

Examples of the amide include cyclic amides and acyclic amides. Examples of the acyclic amide include alkoxyalkylamides.

Examples of the cyclic amide include lactams. Examples of the lactam include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

Examples of the alkoxyalkylamide include 3-methoxy-N,N-dimethylpropionamide, 3-methoxy-N,N-diethylpropionamide, 3-methoxy-N,N-methylethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and N,N-dimethylisobutylamide.

Examples of the alcohol include compounds in which a hydrogen atom included in an alkane is substituted with a hydroxy group. The carbon number of the alkane is preferably 10 or less, more preferably 6 or less, and further preferably 3 or less. The carbon number of alkane is 1 or more and preferably 2 or more. The alkane may be a strait-chain type or may be a branch type. Examples of the alcohol include methanol, ethanol, n-propyl alcohol, isopropyl alcohol, n-butanol, 2-butanol, tert-butanol, iso-butanol, n-pentanol, 2-pentanol, 3-pentanol, tert-pentanol, 2-phenoxyethanol, benzyl alcohol, and phenoxypropanol.

The polyhydric alcohol has two or more hydroxy groups in the molecule. The polyhydric alcohols can be divided into alkanediols and polyols.

Examples of the alkanediol include compounds in which an alkane has two hydroxy groups as substituents. Examples of the alkanediol include 1,2-alkanediol which is a generic term of compounds including hydroxy groups serving as substituents at position 1 and position 2 of the alkane and alkanediols other than 1,2-alkanediol.

Examples of the 1,2-alkanediol include ethylene glycol, propane-1,2-diol (propylene glycol), 1,2-butanediol (1,2BD), 1,2-pentanediol (1,2PD), 1,2-hexanediol (1,2HD), 1,2-heptanediol, 1,2-octanediol, 1,2-nonanediol, 1,2-decanediol, 3-methyl-1,2-butanediol, 3-methyl-1,2-pentanediol, 4-methyl-1,2-pentanediol, 3,4-dimethyl-1,2-pentanediol, 3-ethyl-1,2-pentanediol, 4-ethyl-1,2-pentanediol, 3-methyl-1,2-hexanediol, 4-methyl-1,2-hexanediol, 5-methyl-1,2-hexanediol, 3,4-dimethyl-1,2-hexanediol, 3,5- dimethyl-1,2-hexanediol, 4,5-dimethyl-1,2-hexanediol, 3-ethyl-1,2-hexanediol, 4-ethyl-1,2-hexanediol, and 3-ethyl-4-methyl-1,2-hexanediol.

Examples of the other alkanediol include 1,3-propanediol, 1,3-butylene glycol (another name: 1,3-butanediol), 1,4-butanediol, 2,3-butanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, and 2-methyl-2-propyl-1,3-propanediol.

Examples of the polyol include condensed materials resulting from intermolecular condensation between hydroxy groups of two or more molecules of alkanediols and compounds having three or more hydroxy groups.

Examples of the condensed material resulting from intermolecular condensation between hydroxy groups of two or more molecules of alkanediols include dialkylene glycols such as diethylene glycol and dipropylene glycol and trialkylene glycols such as triethylene glycol and tripropylene glycol.

The compound having three or more hydroxy groups is a compound having three or more hydroxy groups and having an alkane or polyether structure as a skeleton. Examples of the compound having three or more hydroxy groups include glycerin, trimethylolethane, trimethylolpropane, 1,2,5-hexanetriol, 1,2,6-hexanetriol, pentaerythritol, and polyoxypropylenetriol.

Only one type of the organic solvents may be used, or two or more types thereof may be used in combination.

Regarding the reaction liquid, the content of the organic solvent having a standard boiling point of 280° C. or higher is preferably 1.0% by mass or more relative to the total amount of the reaction liquid, more preferably 3.0% by mass or more, and further preferably 5.0% by mass or more. When the organic solvent having a standard boiling point of 280° C. or higher is contained within the above-described range, the nozzle of the ink jet head is moisturized, and favorable ejection stability can be ensured. Such a mode is useful in the ink jet recording method according to the present embodiment in which the reaction liquid and the white ink composition are attached by the same main scanning and in which aggregates tend to be generated in the nozzle.

In this regard, examples of the organic solvent having a standard boiling point of 280° C. or higher include glycerin, polyethylene glycols, and monomethyl ethers. The organic solvent having a standard boiling point of 280° C. or higher is also referred to as a humectant.

From the viewpoint of favorably adjusting the viscosity and the surface tension, the reaction liquid favorably contains one or more selected from alkanediols, polyols, and alkylene glycol ethers as the organic solvent and more favorably contains alkane diols, condensed materials resulting from intermolecular condensation between hydroxy groups of two or more molecules of alkanediols, or alkylene glycol monoalkyl ethers.

The content of the organic solvent is preferably from 5% to 30% by mass relative to the total amount of the reaction liquid, more preferably from 8% to 25% by mass, further preferably from 10% to 23% by mass, and particularly preferably from 12% to 20% by mass.

Water

The reaction liquid may contain water. Examples of the water include ion-exchanged water, ultrafiltrate water, reverse osmosis water, pure water such as distilled water, and water, such as ultrapure water, including decreased ionic impurities. In this regard, using of water sterilized by ultraviolet irradiation, addition of hydrogen peroxide, or the like enables bacteria and fungi to be suppressed from being generated when the reaction liquid is stored for a long time.

The content of the water is preferably 40% by mass or more relative to the total amount of the reaction liquid, more preferably 45% by mass or more, further preferably 50% by mass or more, and particularly preferably 60% by mass or more. There is no particular limitation regarding the upper limit of the content of the water. The content is, for example, preferably 90% by mass or less relative to the total amount of the reaction liquid, more preferably 85% by mass or less, and further preferably 90% by mass or less.

Other Components

The reaction liquid may contain, as the situation demands, additives such as a pH adjuster, a preservative and fungicide, a rust inhibitor, a chelating agent, a viscosity adjuster, a dissolution auxiliary, and an antioxidant. When such an additive is contained, the content is preferably from 0.1% to 5% by mass relative to the total amount of the reaction liquid, more preferably from 0.1% to 3% by mass, and further preferably from 0.1% to 1% by mass.

In addition, the reaction liquid may contain a coloring material such as a pigment, and the content is preferably 0.2% by mass or less relative to the total amount of the reaction liquid, more preferably 0.1% by mass or less, and further preferably 0.05% by mass or less. The lower limit is 0% by mass. Favorably, the reaction liquid contains no coloring material.

Producing Method

The reaction liquid is obtained by mixing the above-described components in an optional order and, as the situation demands, removing impurities through filtration or the like. Regarding the mixing method of the components, a method in which materials are successively placed in a container provided with an agitation device such as a mechanical stirrer, a magnetic stirrer, or the like and agitation and mixing are performed is favorably used. Regarding the filtration method, centrifugal filtration, filter filtration, or the like can be performed, as the situation demands.

Physical Properties

From the viewpoint of the balance between the recording quality and the reliability of the reaction liquid used for ink jet recording, the surface tension at 25° C. of the reaction liquid is preferably 10 mN/m or more and 40 mN/m or less and more preferably 20 mN/m or more and 35 mN/m or less. Regarding the measurement of the surface tension, for example, Automatic Surface Tentiometer CBVP-Z (trade name, produced by Kyowa Interface Science Co., Ltd.) is used, and the measurement can be performed by examining the surface tension when a platinum plate is wet with an ink in an environment at 25° C.

The viscosities (for example, at 20° C.) of the reaction liquid and the white ink composition described later are preferably 4.0 mPa·s or more, more preferably 4.5 mPa·s or more, and further preferably 5.0 mPa·s or more. When the viscosity before a reaction is set to be relatively high, as described above, fluffing can be more favorably suppressed, and more favorable image quality (degree of whiteness) tends to be obtained. In this regard, from the viewpoint of the balance between the recording quality and the reliability of the reaction liquid used for ink jet recording, the upper limit of the viscosity is preferably 15 mPa·s or less, more preferably 10 mPa·s or less, and further preferably 8 mPa·s or less. Regarding the measurement of the viscosity, for example, a rheometer MCR-300 (trade name, produced by Pysica) is used, and the viscosity can be measured in an environment at 20° C.

In this regard, the viscosity (for example, at 20° C.) of an equivalent liquid mixture of the reaction liquid and the white ink composition described later is preferably 50 mPa·s or more, more preferably 70 mPa·s or more, and further preferably 90 mPa·s or more. When the viscosity of the mixture is within the above-described range, since fluff can be more favorably fixed, fluffing can be more favorably suppressed, and more favorable image quality (degree of whiteness) tends to be obtained.

1.1.3 Fabric

Examples of the form of the fabric used in the ink jet recording method according to the present embodiment include cloth, clothing, and other dress accessories. The cloth include textiles, knitted fabric, nonwoven fabric, and the like. The clothing and other dress accessories include, for example, T-shirts after sewing, handkerchiefs, scarfs, towels, string bags, cloth bags, curtains, sheets, bed covers, and furniture such as wall paper and, in addition, cloths before or after cutting as components before sewing. Examples of the form of these include long materials rolled into the shape of a roll, materials cut into a predetermined size, and materials in the shape of a product.

Examples of the raw material constituting the fabric include natural fibers such as cotton, hemp, wool, and silk, synthetic fibers such as polypropylenes, polyesters, acetate, triacetate, polyamides, and polyurethanes, and biodegradable fibers such as polylactic acids, and blended fiber of these may be included.

Of these raw materials, the fabric may be cotton fabric or mixed yarn fabric containing cotton. Since such fabric has excellent water absorbing property and fluff tends to be generated, fluffing and image quality (degree of whiteness) problems more readily occur. On the other hand, according to the ink jet recording method of the present embodiment, even when such fabric is used, fluffing can be favorably suppressed, and favorable image quality (degree of whiteness) can be obtained.

There is no particular limitation regarding the weight per unit area of the fabric, and the weight per unit area may be 1.0 oz (ounce) or more and 10.0 oz or less and is preferably 2.0 oz or more and 9.0 oz or less, more preferably 3.0 oz or more and 8.0 oz or less, and further preferably 4.0 oz or more and 7.0 oz or less.

In addition, the fabric may have fluff which is fiber protruded from a fiber bundle constituting the fabric and fluff having a length between the surface of the fiber bundle and the top of the fluff in a vertical direction of 50 μm or more may be included. Regarding such fabric, fluffing and image quality (degree of whiteness) problems more readily occur. On the other hand, according to the ink jet recording method of the present embodiment, even when such fabric is used, fluffing can be favorably suppressed, and favorable image quality (degree of whiteness) can be obtained.

The above-described length can be measured using a known unit, for example, Digital Microscope (VHX-5000, KEYENCE), and the above-described length may be determined as an average value (arithmetic average) of a plurality of fluff (for example, 10).

In this regard, "fiber bundle" is a bundle of a plurality of fibers and has a substantially circular cross section. In addition, "fluff" is an end portion of a short fiber erect from the surface of a fiber bundle, and an end portion of a short fiber present in the interior of the fiber bundle is not called fluff.

The fabric may be a colored fabric having L* of 70 or less. Regarding a colored fabric colored with a dye or the like in advance, when the L* value of a colored portion is 70 or less, the color of the fabric itself may be seen through the attached portion of the white ink composition, and an image quality (degree of whiteness) problem more readily occurs. On the other hand, according to the ink jet recording method of the present embodiment, even when such fabric is used, fluffing can be favorably suppressed, and favorable image quality (degree of whiteness) can be obtained.

In this regard, "L" represents the brightness in the L*a*b* color space. The L* value can be measured using a known colorimeter, and the measurement can be performed using, for example, Spectrolino (Gretag). The L* value may be 60 or less and may be 50 or less.

Examples of the dye with which the fabric is colored in advance include water-soluble dyes such as acidic dyes and basic dyes, dispersion dyes in which a dispersing agent (surfactant) is used in combination, and reactive dyes. Regarding the method for coloring the fabric with a dye, a known method can be adopted in accordance with the forming material, the form, and the like of the fabric.

1.2 Ink Attachment Step

The ink jet recording method according to the present embodiment includes an ink attachment step of attaching a white ink composition to the fabric with the attached reaction liquid.

1.2.1 Attachment Mode

In the ink jet recording method according to the present embodiment, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, and the same main scanning is performed a plurality of times with respect to the same scanning region.

In the ink jet recording method according to the present embodiment, $$(\text{amount of attachment in first pass}) > \qquad (1)$$
$$(\text{amount of attachment in } nth \text{ pass})$$

$$(\text{amount of attachment in first pass}) + \qquad (2)$$
$$(\text{amount of attachment in } nth \text{ pass}) \geq 20 \text{ mg/inch}^2$$

where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

Since the attachment mode in the ink attachment step is akin to that of the above-described reaction liquid attachment step, explanations are omitted.

1.2.2 White Ink Composition

The white ink composition contains one or both of a white pigment or a resin particle.

Each component contained in the white ink composition will be described below.

White Pigment and Resin Particle

The white ink composition contains one or both of a white pigment or a resin particle. These components may take action to aggregate in response to contact with the reaction liquid.

In the present specification, a word "white" with respect to the white ink composition, the white pigment, and the like not only indicates perfect white but also includes a color slightly colored with a chromatic color or an achromatic color and a glossy color within the bounds of being visually perceived as white. For example, white may be a color having L* of 80 or more and each of a* and b* of ±10 or less in CIELAB and, further, may be a color having L* of 90 or more and each of a* and b* of ±50 or less.

White Pigment

Examples of the white pigment include C.I. Pigment White 1 which is basic lead carbonate, C.I. Pigment White 4 composed of zinc oxide, C.I. Pigment White 5 composed of a mixture of zinc sulfide and barium sulfate, C.I. Pigment White 6 composed of titanium dioxide, C.I. Pigment White 6:1 composed of titanium dioxide containing another metal oxide, C.I. Pigment White 7 composed of zinc sulfide, C.I. Pigment White 18 composed of calcium carbonate, C.I. Pigment White 19 composed of clay, C.I. Pigment White 20 composed of mica titanium, C.I. Pigment White 21 composed of barium sulfate, C.I. Pigment White 22 composed of gypsum, C.I. Pigment White 26 composed of magnesium oxide-silicon dioxide, C.I. Pigment White 27 composed of silicon dioxide, and C.I. Pigment White 28 composed of anhydrous calcium silicate. Of these, C.I. Pigment White 6 having excellent color developability, shielding performance, and the like may be used.

The average particle diameter of the white pigment is preferably 100 nm or more and 500 nm or less, more preferably 50 nm or more and 450 nm or less, and further preferably 200 nm or more and 400 nm or less. When the average particle diameter of the white pigment is set to be within the above-described range, the ejection stability of the ink jet head tends to be ensured. In addition, the shielding performance tends to be improved. In this regard, in the present specification, "average particle diameter" denotes a particle diameter at a cumulative volume of 50% by volume with respect to the volume-based particle size distribution, unless otherwise specified. The average particle diameter is measured by a dynamic light scattering method or a laser diffraction method described in JIS Z 8825. Specifically, a particle size distribution analyzer (for example, "Microtrac UPA" produced by NIKKISO CO., LTD.) can be adopted, where a measurement principle is a dynamic light scattering method.

Only one type of the white pigments may be used, or two or more types thereof may be used in combination.

When the white pigment is contained, the content is preferably from 1% to 30% by mass relative to the total amount of the white ink composition, more preferably from 2% to 25% by mass, further preferably from 4% to 20% by mass, particularly preferably from 6% to 15% by mass, and more particularly preferably from 8% to 12% by mass. When the content of the white ink pigment is within the above-described range, fluffing can be more favorably suppressed, and more favorable image quality (degree of whiteness) tends to be obtained.

The white pigment may be dispersed using a pigment dispersing agent and used. In this regard, the surface of the pigment may be oxidized or sulfonated by ozone, hypochlorous acid, fuming sulfuric acid, or the like, and the white pigment may be dispersed as a self-dispersion pigment and used.

The pigment dispersing agent has a function of dispersing a pigment in an ink. The pigment dispersing agent may be water-soluble but favorably does not have perfect water solubility. It is conjectured that a portion of or entire pigment dispersing agent bonds to or adsorb a pigment so as to enhance the hydrophilicity of the surface of the pigment and, therefore, disperses the pigment. There is no particular limitation regarding the type of the pigment dispersing agent.

The pigment dispersing agent is a polymer compound, and examples thereof include acrylic resins such as poly (meth)acrylic acids, (meth)acrylic acid-acrylonitrile copolymers, (meth)acrylic acid-(meth)acrylic acid ester copolymers, vinyl acetate-(meth)acrylic acid ester copolymers, vinyl acetate-(meth)acrylic acid copolymers, vinylnaphthalene-(meth)acrylic acid copolymers, styrene-(meth)acrylic acid copolymers, styrene-(meth)acrylic acid-(meth)acrylic acid ester copolymers, styrene-∝-methylstyrene-(meth) acrylic acid copolymers, and styrene-∝-methylstyrene-(meth)acrylic acid-(meth)acrylic acid ester copolymers and salts of these.

In addition, examples of the pigment dispersing agent include resins, for example, maleic-acid-based resins such as styrene-maleic acid copolymers, styrene-maleic anhydride copolymers, vinylnaphthalene-maleic acid copolymers, and vinyl acetate-maleic acid ester and salts of these; urethane-based resins regardless of having a cross-linking structure and salts of these; polyvinyl alcohols; and vinyl-acetate-crotonic acid copolymers and salts of these.

In this regard, the acrylic resin may be a copolymer of an acrylic monomer and another monomer in addition to the above-described polymers of acrylic monomers. For example, acryl vinyl resins that are copolymers of other monomers and vinyl-based monomers are referred to as acrylic resins. In addition, for example, of the above-described styrene-based resins, copolymers of styrene-based monomers and acrylic monomers are included in the acrylic resins. Further, "acrylic resins" include salts thereof and esterification products thereof.

Examples of the commercially available product of the pigment dispersing agent include X-200, X-1, X-205, X-220, and X-228 (produced by SEIKO PMC CORPORATION), Nopco Sperse (registered trademark) 6100 and 6110 (produced by San Nopco Limited), Joncryl 67, 586, 611, 678, 680, 682, and 819 (produced by BASF), DISPERBYK-190 (produced by BYK Japan KK), and N-EA137, N-EA157, N-EA167, N-EA177, N-EA197D, N-EA207D, and E-EN10 (produced by Dai-ichi Kogyo Seiyaku Co., Ltd.).

Examples of the commercially available product of the acrylic pigment dispersing agent include BYK-187, BYK-190, BYK-191, BYK-194N, and BYK-199 (produced by BYK-Chemie GmbH) and ARON A-210, A6114, AS-1100, AS-1800, A-30SL, A-7250, and CL-2 (produced by TOA-GOSEI Co., Ltd.).

Examples of the commercially available product of the urethane-based pigment dispersing agent include BYK-182, BYK-183, BYK-184, and BYK-185 (produced by BYK-Chemie GmbH), TEGO Disperse 710 (produced by Evonic Tego Chemi), and Borchi (registered trademark) Gen1350 (produced by OMG Borschers).

Only one type of the pigment dispersing agents may be used, or two or more types thereof may be used in combination. The total content of the pigment dispersing agent is preferably 0.1% by mass or more and 30% by mass or less relative to 100% by mass of the white ink composition, more preferably 0.5% by mass or more and 25% by mass or less, further preferably 1% by mass or more and 20% by mass or less, and particularly preferably 1.5% by mass or more and 15% by mass or less. When the content of the pigment dispersing agent is 0.1% by mass or more, the dispersion stability of the white pigment tends to be ensured. In addition, when the content of the pigment dispersing agent is 30% by mass or less, the viscosity of the white ink composition tends to be decreased.

In this regard, the weight average particle diameter of the pigment dispersing agent is further preferably 500 or more. When such a pigment dispersing agent is used, smell is decreased, and the dispersion stability of the white pigment tends to be further improved.

When the white pigment is dispersed by the pigment dispersing agent, the ratio of the white pigment to the pigment dispersing agent is preferably from 10:1 to 1:10 and more preferably from 4:1 to 1:3.

Resin Particle

The resin particle has a function of so-called a fixing resin which improves the adhesiveness of the ink attached to the fabric. The resin particle is frequently handled in an emulsion form and may have properties of a powder.

Examples of the resin particle include resin particles composed of urethane-based resins, acrylic resins (including styrene-acrylic resins), fluorene-based resins, olefin-based resins, rosin-modified resins, terpen-based resins, ester-based resins, amide-based resins, epoxy-based resins, vinyl chloride-based resins, vinyl chloride-vinyl acetate resin copolymers, or ethylene vinyl acetate resins. Of these, urethane-based resins, acrylic resins, olefin-based resins, and ester-based resins are favorable. In this regard, only one type of the resin particles may be used, or two or more types thereof may be used in combination.

"Urethane-based resin" is a generic term of resins having a urethane bond. Regarding the urethane-based resin, polyether-type urethane resins having, in addition to a urethane bond, an ether bond in a main chain, ester-type urethane resins having an ester bond in a main chain, and carbonate-type urethane resins having a carbonate bond in a main chain, and the like may be used. In this regard, commercially available products may be used as the urethane-based resin, and examples include SUPERFLEX 460, 460s, 840, and E-4000 (trade names, produced by Dai-ichi Kogyo Seiyaku Co., Ltd.), RESAMINE D-1060, D-2020, D-4080, D-4200, D-6300, and D-6455 (trade names, produced by Dainichiseika Color & Chemicals Mfg. Co., Ltd.), TAKELAC WS-5100, WS-6021, and W-512-A-6 (trade names, produced by MITSUI CHEMICALS POLYURE-THANE INC.), Sancure 2710 (trade name, produced by LUBRIZOL), and PERMARIN UA-150 (trade name, produced by Sanyo Chemical Industries, Ltd.).

"Acrylic resin" is a generic name of polymers obtained by polymerizing at least an acrylic monomer such as a (meth) acrylic acid or a (meth)acrylic acid ester serving as one component, and examples include resins obtained from acrylic monomers and copolymers of acrylic monomers and monomers other than acrylic monomers. Examples of the acrylic resin include acryl-vinyl-based resins which are copolymers of acrylic monomers and vinyl-based monomers. In this regard, examples of the vinyl-based monomer include styrene.

Regarding the acrylic monomer, acrylamide, acrylonitrile, and the like can also be used. A commercially available product may be used as a resin emulsion in which the acrylic resin serves as a raw material and may be selected from, for example, FK-854 (trade name, produced by CHUORIKA KOUGYO Co., Ltd.), Mowinyl 952B and 718A (trade names, produced by The Nippon Synthetic Chemical Industry Co., Ltd.), and Nipol LX852 and LX874 (trade names, produced by ZEON Corporation) and used.

The styrene-acrylic resin is a copolymer obtained from a styrene-based monomer and a (meth)acrylic monomer, and examples include styrene-acrylic acid copolymers, styrene-methacrylic acid copolymers, styrene-methacrylic acid-acrylic acid ester copolymers, styrene-$\alpha$-methylstyrene-acrylic acid copolymers, and styrene-$\alpha$-methylstyrene-acrylic acid-acrylic acid ester copolymers. A commercially available product may be used as the styrene-acrylic resin, and examples include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, produced by BASF), Mowinyl 966A and 975N (trade names, produced by The Nippon Synthetic Chemical Industry Co., Ltd.), and Vinyblan 2586 (produced by Nisshin Chemical Industry Co., Ltd.).

The olefin-based resin is a polymer containing an olefin such as ethylene, propylene, butylene, or the like in a structure skeleton, and a known material can be appropriately selected and used. A commercially available product can be used as the olefin-based resin, and examples include Arrowbase CB-1200 and CD-1200 (trade names, produced by UNITIKA LTD.).

The resin particle is more favorably selected from urethane-based resins and acrylic resins and is further favorably a urethane-based resin. Consequently, an image formed of the white ink composition readily has favorable base-material-following performance.

When the resin particle is contained, the content (solid content) is preferably from 1% to 30% by mass relative to the total amount of the white ink composition, more preferably from 2% to 25% by mass, further preferably from 4% to 20% by mass, particularly preferably from 6% to 15% by mass, and more particularly preferably from 8% to 12% by mass. When the content of the resin particle is within the above-described range, fluffing can be more favorably suppressed, and more favorable image quality (degree of whiteness) tends to be obtained.

Surfactant

The white ink composition may contain a surfactant. The type, content, and the like of the surfactant in the white ink composition are akin to that in the above-described reaction liquid. Therefore, explanations are omitted.

Organic Solvent

The white ink composition may contain an organic solvent. The type, content, and the like of the organic solvent in the white ink composition are akin to that in the above-described reaction liquid. Therefore, explanations are omitted.

In particular, the white ink composition further contains preferably 1.0% by mass or more of organic solvent having a standard boiling point of 280° C. or higher relative to the total amount of the ink composition, more preferably 3.0% by mass or more, and further preferably 5.0% by mass or more. When the organic solvent having a standard boiling point of 280° C. or higher is contained within the above-described range, the nozzle of the ink jet head is moisturized, and favorable ejection stability can be ensured. Such a mode is useful in the ink jet recording method according to the present embodiment in which the reaction liquid and the white ink composition are attached by the same main scanning and in which aggregates tend to be generated in the nozzle.

Water

The white ink composition may contain water. The type, the content, and the like of the water in the white ink composition are akin to that in the above-described reaction liquid. Therefore, explanations are omitted.

Other Components

The white ink composition may contain, as the situation demands, additives such as a pH adjuster, a preservative and fungicide, a rust inhibitor, a chelating agent, a viscosity adjuster, a dissolution auxiliary, and an antioxidant. When such an additive is contained, the content is preferably from 0.1% to 5% by mass relative to the total amount of the white ink composition, more preferably from 0.1% to 3% by mass, and further preferably from 0.1% to 1% by mass.

Production Method and Physical Properties

The production method and physical properties with respect to the white ink composition are akin to that of the above-described reaction liquid. Therefore, explanations are omitted.

1.3 Heat-Drying Step

The ink jet recording method according to the present embodiment may include a step (heat-drying step) of heat-drying the ink and the like attached to the fabric after the reaction liquid attachment step and the ink attachment step.

There is no particular limitation regarding the heat-drying method, and examples include a belt conveyer oven, a normal-pressure steam method, a high-pressure steam method, and a thermofix method. There is no particular limitation regarding the heat source during heat-drying, and for example, an infrared lamp can be used.

The heat-drying temperature is favorably a temperature at which the resin particle that may be contained in the ink is fusion-bonded and at which a medium such as water is vaporized. The heat-drying temperature is, for example, preferably 100° C. or higher and 250° C. or lower, more preferably 120° C. or higher and 230° C. or lower, further preferably 140° C. or higher and 210° C. or lower, and particularly preferably 160° C. or higher and 200° C. or lower. Herein, the heat-drying temperature in the heat-drying step is a surface temperature of the image or the like formed on the fabric. There is no particular limitation regarding the time for performing heat-drying, and the time is preferably 30 sec or more and 20 min or less and more preferably 2 min or more and 5 min or less.

1.4 Other Steps

The ink jet recording method according to the present embodiment may include a step of washing the recorded fabric, a step of performing heat-drying again, and the like. Regarding washing, as the situation demands, a component of ink or the like not fixed to the fabric may be washed away by using a hot soap solution or the like, as soaping treatment.

In addition, the ink jet recording method according to the present embodiment may include a step of attaching a nonwhite ink composition to the fabric.

The nonwhite ink composition favorably contains a coloring material other than the white pigment. The coloring material may be a pigment or a dye. The component other than the coloring material can be akin to that in the above-described white ink composition.

Regarding the pigment, inorganic pigments such as carbon black, organic pigments, and the like can be used. Examples of the organic pigment include quinacridone-based pigments, quinacridonequinone-based pigments, dioxadine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments.

1.5 Ink Jet Recording Apparatus

An example of the ink jet recording apparatus capable of performing the ink jet recording method according to the present embodiment will be described.

FIG. 1 is a schematic sectional view illustrating an ink jet recording apparatus. FIG. 2 is a perspective view illustrating an example of the configuration around a carriage of the ink jet recording apparatus 1 in FIG. 1. As illustrated in FIG. 1 and FIG. 2, the ink jet recording apparatus 1 includes an ink jet head 2, an IR heater 3, a platen heater 4, a heating heater 5, a cooling fan 6, a preheater 7, a ventilation fan 8, a carriage 9, a platen 11, a carriage movement mechanism 13, a transport unit 14, and a control portion CONT. Regarding the ink jet recording apparatus 1, all actions of the ink jet recording apparatus 1 are controlled by the control portion CONT illustrated in FIG. 2.

Ink jet head 2 is configured to perform recording on a fabric M by ejecting a white ink composition and a reaction liquid (hereafter also referred to as "ink and the like") from a nozzle of the ink jet head 2 so as to attach. The ink jet head 2 illustrated in FIG. 1 and FIG. 2 is a serial-type ink jet head and attaches the ink and the like to the fabric M by performing scanning a plurality of times in the main scanning direction relative to the fabric M. The ink jet head 2 is mounted on the carriage 9 illustrated in FIG. 2. The ink jet head 2 is made to scan a plurality of times in the main scanning direction relative to the fabric M by the action of the carriage movement mechanism 13 which moves the carriage 9 in the medium width direction of the fabric M. The medium width direction is the main scanning direction of the ink jet head 2. Scanning in the main scanning direction is also referred to as main scanning.

In this regard, the main scanning direction is the direction of movement of the carriage 9 incorporated with the ink jet head 2. In FIG. 1, the main scanning direction is the direction intersecting the sub-scanning direction that is indicated by arrow SS and that is the transport direction of the fabric M. In FIG. 2, the width direction of the fabric M, that is, the direction indicated by S1-S2, is the main scanning direction MS, and the direction indicated by T1→T2 is the sub-scanning direction SS. In this regard, in a single time of scanning, scanning is performed in the main scanning direction, that is, in one of the directions indicated by arrow S1 and arrow S2. Then, recording on the fabric M is performed by repeating, a plurality of times, the main scanning of the ink jet head 2 and sub-scanning that is transportation of the fabric M.

The cartridge 12 for supplying the ink and the like to the ink jet head 2 includes a plurality of cartridges independent of each other. The cartridge 12 is detachably fit to the carriage 9 incorporated with the ink jet head 2. A plurality of cartridges can be filled with respective types of ink and the like that differ from each other, and the ink and the like are supplied to the respective nozzles from the cartridge 12. In this regard, in the cartridge 12, nonwhite ink compositions exhibiting colors such as black, cyan, magenta, yellow, and orange other than the white ink composition and the reaction liquid may be separately stored and may be used in any combination. FIG. 1 and FIG. 2 illustrate an example in which the cartridge 12 is fit to the carriage 9, but the form is not limited to this. A form in which the cartridge 12 is disposed in a place other than the carriage 9 and the ink and the like are supplied to the respective nozzles through supply pipes not illustrated in the drawing may be adopted.

A known system in the related art can be adopted in ejection of the ink jet head 2. Herein, a system in which a liquid droplet is ejected by utilizing vibration of a piezoelectric element, that is, an ejection system in which an ink droplet or the like is formed due to mechanical deformation of an electrostriction element, is used.

The ink jet recording apparatus 1 can include a first heating mechanism for heating the fabric M when the ink and the like are ejected from the ink jet head 2 and attached to the fabric M. The first heating mechanism of a conduction type, an air-blowing type, an irradiation type, or the like can be used. The conduction type conducts heat from a member in contact with the fabric M to a recording medium. Examples include a platen heater. The air-blowing type dries ink and the like by sending normal-temperature air or warm air to the recording medium. Examples include an air-blowing fan. The irradiation type heats the recording medium by applying radiation that generates heat to the fabric. Examples include IR irradiation. In this regard, although not illustrated in the drawing, a heater akin to the platen heater may be disposed immediately downstream the platen heater 4 in the direction SS. Only one type of the first heating mechanisms may be used, or two or more types thereof may be used in combination. For example, an IR heater 3 and the platen heater 4 are included as the first heating mechanisms. In this regard, there is no particular limitation regarding the disposition position of the first heating mechanism provided that the first heating mechanism is disposed at a position at which the fabric M can be dried and heated. The first heating mechanism may be disposed independently of the ink jet recording apparatus 1.

Using the IR heater 3 enables the fabric M to be heated by the irradiation type using radiation of infrared rays from the ink jet head 2 side. Consequently, the ink jet head 2 tends to be simultaneously heated, but the temperature can be increased without being influenced by the thickness of the fabric M compared with the instance in which heating is performed from the back surface of the fabric M by the platen heater 4 or the like. In this regard, various fans (for example, the ventilation fan 8) that dry the ink and the like on the fabric M by applying warm air or air at the same temperature as the environment to the fabric M may be included.

The platen heater 4 can heat the fabric M at a position opposing the ink jet head 2 through a platen 11. The platen heater 4 can heat the fabric M by the conduction system and is used in the ink jet recording method, as the situation demands.

In addition, the ink jet recording apparatus 1 may include the preheater 7 for heating the fabric M in advance before the ink and the like are attached to the fabric M.

A post-heating mechanism for heating the fabric M so as to dry and fix the ink and the like may be included after the ink attachment step and the reaction liquid attachment step. There is no particular limitation regarding the disposition position of the post-heating mechanism provided that the post-heating mechanism is disposed at the position at which the fabric M can be dried and fixed, and the post-heating mechanism may be disposed independently of the ink jet recording apparatus 1.

The heating heater 5 used for the post-heating mechanism dries and solidifies the ink and the like attached to the fabric

23

M. The heating heater 5 heating the fabric M recorded with an image more promptly vaporizes and scatters water and the like contained in the ink and the like so that an ink film

24

Composition 1 to Composition 6 were obtained. In this regard, ion-exchanged water was added so that the total mass of the composition was set to be 100% by mass.

TABLE 1

| | Ink species | Reaction liquid | Reaction liquid | Reaction liquid | Reaction liquid | Reaction liquid | Reaction liquid |
|---|---|---|---|---|---|---|---|
| Category | Raw material name | Composition 1 | Composition 2 | Composition 3 | Composition 4 | Composition 5 | Composition 6 |
| Aggregation agent | Magnesium sulfate heptahydrate | 5 | 5 | 5 | 5 | 5 | 2 |
| Organic solvent | Glycerin | 5 | 5 | 5 | 5 | 4 | 5 |
| | Triethylene glycol | 5 | 5 | 5 | 5 | 5 | 5 |
| | Triethylene glycol monobutyl ether | 1 | 1 | 1 | 1 | 1 | 1 |
| | Propylene glycol | 6 | 6 | 6 | 3 | 5 | 6 |
| Surfactant | BYK-348 (HLB value: 11) Silicon-based surfactant | 0.5 | — | — | 0.5 | 0.5 | 0.5 |
| | KF-6004 (HLB value: 9) Silicon-based surfactant | — | — | 0.5 | — | — | — |
| | OLFIN E1010 (HLB value: 12) Acetylene-based surfactant | — | 0.5 | — | — | — | — |
| Water | Ion-exchanged water | rest | rest | rest | rest | rest | rest |
| Viscosity (mPa · s) | | 5.0 | 5.0 | 5.0 | 4.4 | 5.0 | 5.0 |
| Surface tension (mN/m) | | 27 | 32 | 25 | 25 | 25 | 25 |
| Standing reliability (occurrence of plugging after standing with cap) | | A | A | A | A | B | A | is formed by the resin particle contained in the ink. Consequently, the ink film is strongly fixed and bonded to the fabric M so as to have excellent film-forming performance, and an excellent and high-quality image can be obtained in a short time.

The ink jet recording apparatus 1 may include the cooling fan 6. After the ink and the like recorded on the fabric M are dried, the ink on the fabric M is cooled by using the cooling fan 6 so that an ink coating film can be formed on the fabric M with favorable adhesiveness.

The platen 11 for supporting the fabric M, the carriage movement mechanism 13 for moving the carriage 9 relative to the fabric M, and the transport unit 14 serving as a roller for transporting the fabric M in the sub-scanning direction are included below the carriage 9. The actions of the carriage movement mechanism 13 and the transport unit 14 are controlled by the control portion CONT.

2. Examples

The present disclosure will be more specifically described below with reference to the examples, but the present disclosure is not limited to these examples. Hereafter, "%" is on a mass basis, unless otherwise specified.

2.1 Preparation of Reaction Liquid

Components were placed in a container so as to have the composition in Table 1, and mixing and agitation were performed for 2 ours by using a magnetic stirrer. Thereafter, filtration was performed using a membrane filter having a pore diameter of 5 μm so that reaction liquids according to 2.2 Preparation of White Ink Composition Components were placed in a container so as to have the composition in Table 2, and mixing and agitation were performed for 2 ours by using a magnetic stirrer. Thereafter, filtration was performed using a membrane filter having a pore diameter of 5 μm so that white ink composition according to Composition A to Composition C were obtained. In this regard, the numerical values of the titanium oxide dispersion and the urethane resin in the table indicate the amount of solid content. Ion-exchanged water was added so that the total mass of the composition was set to be 100% by mass. A pigment dispersion liquid prepared in advance by the following procedure was used as the white pigment.

C.I. Pigment White 6 (specific gravity: 4.2 g/mL) was used as the pigment, and an anionic resin dispersing agent was used as the pigment dispersing agent. Specifically, a styrene-acrylic resin synthesized using 55% by mass of styrene, 20% by mass of acrylic acid, and 30% by mass of methyl methacrylate was used. A titanium oxide dispersion was obtained by performing mixing using 1 part by mass of dispersing agent and 10 parts by mass of ion-exchanged water relative to 3 parts by mass of pigment, premixing the resulting mixture, performing dispersion by using a bead mill disperser (UAM-015, produced by Kotobuki Industries Co., Ltd.) with zirconia beads having a diameter of 0.03 mm at a circumferential velocity of 10 m/s and a liquid temperature of 30° C. for 15 min, and centrifugally separating coarse particles by using a centrifuge (Model-3600 produced by KUBOTA CORPORATION).

TABLE 2

| Ink species | | Wh ink (anion) | Wh ink (anion) | Wh ink (anion) |
|---|---|---|---|---|
| Category | Raw material name | Composition A | Composition B | Composition C |
| White pigment | Titanium oxide dispersion solid content (anionic resin dispersion) | 10 | 10 | 10 |
| Resin particle | Urethane resin solid content (TAKELAC WS-6021) | 10 | 10 | 10 |
| Organic solvent | Glycerin | 5 | 5 | 4 |
| | Triethylene glycol | 5 | 5 | 5 |
| | Triethylene glycol monobutyl ether | 1 | 1 | 1 |
| | Propylene glycol | 6 | 3 | 5 |
| Surfactant | BYK-348 (HLB value: 11) Silicon-based surfactant | 0.5 | 0.5 | 0.5 |
| | KF-6004 (HLB value: 9) Silicon-based surfactant | — | — | — |
| | OLFIN E1010 (HLB value: 12) Acetylene-based surfactant | — | — | — |
| Water | Ion-exchanged water | rest | rest | rest |
| | Viscosity (mPa · s) | 5.0 | 4.4 | 5.0 |
| | Surface tension (mN/m) | 25 | 25 | 25 |
| | Standing reliability (occurrence of plugging after standing with cap) | A | A | B |

The descriptions in Table 1 and Table 2 are supplementarily explained.

TAKELAC WS-6021 (trade name, produced by MITSUI CHEMICALS POLYURETHANE INC.)

BYK-348 (trade name, produced by BYK)

KF-6004 (trade name, produced by Shin-Etsu Chemical Co., Ltd.)

OLFIN E1010 (trade name, produced by Nissin Chemical Industry Co., Ltd.)

The viscosity was measured using a rheometer MCR-300 (trade name, produced by Pysica) in an environment at 20° C. In addition, the surface tension was measured using Automatic Surface Tentiometer CBVP-Z (trade name, produced by Kyowa Interface Science Co., Ltd.) so as to examine the surface tension when a platinum plate was wet with a reaction liquid or a white ink composition in an environment at 25° C.

2.3 Recording Condition

Textile-printed materials according to the examples and the comparative examples were obtained by using the reaction liquid and the white ink composition obtained through the above-described preparation and performing recording under the following conditions and under the conditions presented in Table 3 and Table 4.

Printer: SC-F2000 (produced by Seiko Epson Corporation). Drying: A fabric provided with the reaction liquid and the white ink composition attached was dried by using a belt conveyer oven (Fusion R 36-6-4, produced by M & R) under the conditions of 180° C. and 3 min.

Fabric: 100% of cotton, black T-shirts (Printstar), L* value of colored portion of 12[−].

Reaction liquid and white ink composition attachment conditions: Resolution of 1440×720 dpi, 360 nozzles/line×4 lines, amount of ejection of 30 ng/dot, and the reaction liquid and the white ink composition were attached to the same scanning region of the fabric by the same main scanning.

TABLE 3

| | Evaluation item | Example 1 Composition 1/ Composition A | Example 2 Composition 1/ Composition A | Example 3 Composition 2/ Composition A | Example 4 Composition 3/ Composition A |
|---|---|---|---|---|---|
| Printing fabric condition | Average fluff height [μm] | 200 | 200 | 200 | 200 |
| Reaction liquid/ Ink ejection condition | Total amount of ejections (first pass) [mg/inch2] | 20 | 15 | 20 | 20 |
| | Total amount of ejections (second pass) [mg/inch2] | 10 | 10 | 10 | 10 |
| | Total amount of ejections (first pass + second pass) | 30 | 25 | 30 | 30 |
| | Total number of passes of carriage on printing surface [time] | 9 | 10 | 9 | 9 |
| | Total amount of ejections on printing surface [mg/inch2] | 100 | 105 | 100 | 100 |
| | Difference in landing time between reaction liquid and ink [s] | 0.3 | 0.3 | 0.3 | 0.3 |
| Viscosity of equivalent liquid mixture of reaction liquid and ink [mPa · s] | | 100 | 100 | 100 | 100 |
| Evaluation item | Image quality (degree of whiteness (L*)) | A | B | A | B |

TABLE 3-continued

| | | | | |
|---|---|---|---|---|
| Fluffing (degree of planarity of printing portion) | A | B | A | B |
| Standing reliability (reaction liquid) (occurrence of plugging after standing with cap) | A | A | A | A |
| Standing reliability (white ink) (occurrence of plugging after standing with cap) | A | A | A | A |

| | Evaluation item | Example 5 Composition 1/ Composition A | Example 6 Composition 4/ Composition B | Example 7 Composition 1/ Composition C | Example 8 Composition 6/ Composition A |
|---|---|---|---|---|---|
| Printing fabric condition | Average fluff height [μm] | 200 | 200 | 200 | 200 |
| Reaction liquid/ Ink ejection condition | Total amount of ejections (first pass) [mg/inch2] | 20 | 20 | 20 | 20 |
| | Total amount of ejections (second pass) [mg/inch2] | 10 | 10 | 10 | 10 |
| | Total amount of ejections (first pass + second pass) | 30 | 30 | 30 | 30 |
| | Total number of passes of carriage on printing surface [time] | 9 | 9 | 9 | 9 |
| | Total amount of ejections on printing surface [mg/inch2] | 100 | 100 | 100 | 100 |
| | Difference in landing time between reaction liquid and ink [s] | 4 | 0.3 | 0.3 | 0.3 |
| Viscosity of equivalent liquid mixture of reaction liquid and ink [mPa · s] | | 100 | 100 | 100 | 50 |
| Evaluation item | Image quality (degree of whiteness (L*)) | C | B | A | C |
| | Fluffing (degree of planarity of printing portion) | C | B | A | C |
| | Standing reliability (reaction liquid) (occurrence of plugging after standing with cap) | A | A | A | A |
| | Standing reliability (white ink) (occurrence of plugging after standing with cap) | A | A | B | A |

TABLE 4

| | Evaluation item | Example 1 Composition 1/ Composition A | Comparative example 1 Composition 1/ Composition A | Comparative example 2 Composition 1/ Composition A | Comparative example 3 Composition 1/ Composition A |
|---|---|---|---|---|---|
| Printing fabric condition | Average fluff height [μm] | 200 | 200 | 200 | 200 |
| Reaction liquid/ Ink ejection condition | Total amount of ejections (first pass) [mg/inch2] | 20 | 10 | 10 | 8 |
| | Total amount of ejections (second pass) [mg/inch2] | 10 | 15 | 10 | 10 |
| | Total amount of ejections (first pass + second pass) | 30 | 25 | 20 | 18 |
| | Total number of passes of carriage on printing surface [time] | 9 | 7 | 10 | 10 |
| | Total amount of ejections on printing surface [mg/inch2] | 100 | 100 | 100 | 98 |
| | Difference in landing time between reaction liquid and ink [s] | 0.3 | 0.3 | 0.3 | 0.3 |
| Viscosity of equivalent liquid mixture of reaction liquid and ink [mPa · s] | | 100 | 100 | 100 | 100 |
| Evaluation item | Image quality (degree of whiteness (L*)) | A | C | C | D |
| | Fluffing (degree of planarity of printing portion) | A | D | D | E |
| | Standing reliability (reaction liquid) (occurrence of plugging after standing with cap) | A | A | A | A |

TABLE 4-continued

|  |  | Comparative example 4 Composition 2/ Composition A | Comparative example 5 Composition 3/ Composition A | Comparative example 6 Composition 1/ Composition A | Comparative example 7 Composition 4/ Composition B |
|---|---|---|---|---|---|
|  | Standing reliability (white ink) (occurrence of plugging after standing with cap) | A | A | A | A |
| | Evaluation item | | | | |
| Printing fabric condition | Average fluff height [μm] | 200 | 200 | 200 | 200 |
| Reaction liquid/ Ink ejection condition | Total amount of ejections (first pass) [mg/inch2] | 10 | 10 | 10 | 10 |
|  | Total amount of ejections (second pass) [mg/inch2] | 10 | 10 | 10 | 10 |
|  | Total amount of ejections (first pass + second pass) | 20 | 20 | 20 | 20 |
|  | Total number of passes of carriage on printing surface [time] | 10 | 10 | 10 | 10 |
|  | Total amount of ejections on printing surface [mg/inch2] | 100 | 100 | 100 | 100 |
|  | Difference in landing time between reaction liquid and ink [s] | 0.3 | 0.3 | 4 | 0.3 |
| Viscosity of equivalent liquid mixture of reaction liquid and ink [mPa · s] | | 100 | 100 | 100 | 100 |
| Evaluation item | Image quality (degree of whiteness (L*)) | C | D | D | D |
|  | Fluffing (degree of planarity of printing portion) | D | D | E | E |
|  | Standing reliability (reaction liquid) (occurrence of plugging after standing with cap) | A | A | A | A |
|  | Standing reliability (white ink) (occurrence of plugging after standing with cap) | A | A | A | A |

The descriptions in Table 3 and Table 4 are supplementarily explained.

"Total amount of ejections (first pass)" is the total amount of attachment per unit area of the reaction liquid and the white ink composition attached to the fabric by the first main scanning with respect to the same scanning region.

"Total amount of ejections (second pass)" is the total amount of attachment per unit area of the reaction liquid and the white ink composition attached to the fabric by the second main scanning with respect to the same scanning region.

"Total amount of ejections on printing surface" is the total amount of attachment per unit area of the reaction liquid and the white ink composition attached to the fabric by the first main scanning to the nth main scanning with respect to the same scanning region (n represents the total number of passes of the carriage on the printing surface).

Regarding the amount of ejections, the weights of the fabric before and after printing were measured, and the difference between these was calculated as the amount of ejections.

"Viscosity of equivalent liquid mixture of reaction liquid and ink" was determined by dropping equal amount of the reaction liquid and the white ink composition on an irrotational plate so as to become symmetrical with respect to the center of the irrotational plate in the measurement portion composed of a disc-like irrotational plate and an rotational plate of a rheometer (MCR 302e, Anton paar) and measuring the viscosity of the liquid 10 sec after start of rotation of the plate at a shear rate of 50 $(s^{-1})$.

2.4 Evaluation Method 2.4.1 Image Quality (Degree of Whiteness)

The L* value (degree of whiteness) of the textile-printed material obtained above was measured using a fluorescent spectral densitometer (FD-7, produced by KONICA MINOLTA, INC.), and the image quality (degree of whiteness) was rated in accordance with the following criteria. Herein, C or more was rated as favorable.

Rating Criteria

A: L* of 86[−] or more

B: L* of from 80 to 85[−]

C: L* of from 75 to 79[−]

D: L* of from 70 to 74[−]

E: L* of 69[−] or less 2.4.2 Fluffing

Regarding the textile-printed material obtained above, the height of fiber (fluff) protruding from the fabric surface was measured using a 3D observation function of a digital microscope (VHX-5000, KEYENCE), and fluffing was rated in accordance with the following criteria. Herein, C or more was rated as favorable. In this regard, an average value of 10 fibers was denoted by "fluff height". The fluff height of the fabric before printing was also measured in the same manner and is presented in Table 3 and Table 4.

Rating criteria

A: fluff height of less than 200 μm

B: fluff height of from 200 μm to 299 μm

C: fluff height of from 300 μm to 399 μm

D: fluff height of from 400 μm to 499 μm

E: fluff height of 500 μm or more 2.4.3 Standing Reliability

The reaction liquid and the white ink composition prepared above were introduced into SC-F2000 (Seiko Epson Corporation) modified machine and were left to stand 2 days under the conditions of a standing temperature of 40° C. and humidity of 20% in the state in which a printer head was sealed with a standing cap. After standing, a nozzle check pattern was performed, and the number of non-ejection nozzles was counted, and the standing reliability was rated in accordance with the following criteria.

Rating Criteria

A: the number of non-ejection nozzles after 3 times of internal cleaning of zero B: the number of non-ejection nozzles after 3 times of internal cleaning of from 1 to 5

C: the number of non-ejection nozzles after 3 times of internal cleaning of from 6 to 10

D: the number of non-ejection nozzles after 3 times of internal cleaning of from 11 to 15

E: the number of non-ejection nozzles after 3 times of internal cleaning of 16 or more 2.5 Evaluation Result The evaluation results are presented in Table 3 and Table 4. In each example, fluffing could be favorably suppressed and favorable image quality (degree of whiteness) was obtained, each example being according to the ink jet recording method including a reaction liquid attachment step of attaching a reaction liquid to a fabric and an ink attachment step of attaching a white ink composition to the fabric with the attached reaction liquid, wherein the reaction liquid contains one or more selected from a polyvalent metal salt, a cationic polymer, and an organic acid as an aggregation agent, the white ink composition contains one or both of a white pigment and a resin particle, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, the same main scanning is performed a plurality of times with respect to the same scanning region, and (amount of attachment in first pass)>(amount of attachment in nth pass)

(amount of attachment in first pass)+(amount of attachment in nth pass)$\geq$20 mg/inch$^2$, where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

On the other hand, the comparative examples that differ from the above-described ink jet recording method were inferior in one or both of suppression of fluffing and the image quality (degree of whiteness).

The following contents are derived from the above-described embodiments.

An aspect of an ink jet recording method includes a reaction liquid attachment step of attaching a reaction liquid to a fabric and an ink attachment step of attaching a white ink composition to the fabric with the attached reaction liquid, wherein the reaction liquid contains one or more selected from a polyvalent metal salt, a cationic polymer, and an organic acid as an aggregation agent, the white ink composition contains one or both of a white pigment and a resin particle, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, the same main scanning is performed a plurality of times with respect to the same scanning region, and (amount of attachment in first pass)>(amount of attachment in nth pass)

(amount of attachment in first pass)+(amount of attachment in nth pass)$\geq$20 mg/inch$^2$, where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more.

In the aspect of the above-described ink jet recording method, the amount of attachment in the first pass may be 10 mg/inch$^2$ or more.

In any one of the aspects of the above-described ink jet recording method, a difference in landing time between the reaction liquid and the white ink composition attached by the same main scanning with respect to the same scanning region may be within 3.0 sec.

In any one of the aspects of the above-described ink jet recording method, the viscosities of the reaction liquid and the white ink composition may be 5.0 mPa·s or more.

In any one of the aspects of the above-described ink jet recording method, the viscosity of an equivalent liquid mixture of the reaction liquid and the white ink composition may be 90 mPa·s or more.

In any one of the aspects of the above-described ink jet recording method, the reaction liquid may further contain a surfactant having an HLB value of 10 or more.

In any one of the aspects of the above-described ink jet recording method, the surfactant may be a silicon-based surfactant or an acetylene-based surfactant.

In any one of the aspects of the above-described ink jet recording method, the white ink composition may further contain, relative to a total amount of the ink composition, 5.0% by mass or more of organic solvent having a standard boiling point of 280° C. or higher.

In any one of the aspects of the above-described ink jet recording method, the fabric may be a colored fabric having L* of 70 or less.

In any one of the aspects of the above-described ink jet recording method, the fabric may be a cotton fabric or a mixed yarn fabric containing cotton.

In any one of the aspects of the above-described ink jet recording method, the fabric may have fluff composed of fiber protruded from a fiber bundle constituting the fabric, and fluff having a length between a surface of the fiber bundle and a top of the fluff in a vertical direction of 50 μm or more may be included.

The present disclosure is not limited to the above-described embodiment and can be variously modified. For example, the present disclosure includes substantially the same configuration as the configuration described in the embodiment, such as, a configuration having the same function, method, and result or a configuration having the same purpose and advantage. In addition, the present disclosure includes a configuration in which non-essential portions of the configuration described in the embodiment are replaced. The present disclosure includes a configuration which exerts the same operation and advantage of the configuration described in the embodiment or a configuration which can achieve the same purpose. The present disclosure includes a configuration in which a known technology is added to the configuration described in the embodiment.

What is claimed is:

1. An ink jet recording method comprising:

a reaction liquid attachment step of attaching a reaction liquid to a fabric; and an ink attachment step of attaching a white ink composition to the fabric with the attached reaction liquid, wherein the reaction liquid contains one or more selected from a polyvalent metal salt, a cationic polymer, and an organic acid as an aggregation agent, the white ink composition contains one or both of a white pigment and a resin particle, the reaction liquid attachment step and the ink attachment step are performed by an ink jet method, the ink jet method performs main scanning a plurality of times, the main scanning performing recording by moving an ink jet head in a direction perpendicular to a transport direction of the fabric, the reaction liquid and the white ink composition are attached to the same scanning region of the fabric by the same main scanning, the same main scanning is performed a plurality of times with respect to the same scanning region, and (amount of attachment in first pass)>(amount of attachment in nth pass)

(amount of attachment in first pass)+(amount of attachment in nth pass)≥20 mg/inch$^2$, where a total amount of attachment per unit area of the reaction liquid and the white ink composition that are attached to the fabric by the first main scanning with respect to the same scanning region is denoted by "amount of attachment in first pass", and a total amount of attachment per unit area of the reaction liquid and the white ink composition that are attached to the fabric by the nth main scanning is denoted by "amount of attachment in nth pass", n being an integer of 2 or more, and a difference in landing time between the reaction liquid and the white ink composition attached by the same main scanning with respect to the same scanning region is within 0.5 sec.

2. The ink jet recording method according to claim 1, wherein the amount of attachment in the first pass is 10 mg/inch$^2$ or more.

3. The ink jet recording method according to claim 1, wherein the viscosities of the reaction liquid and the white ink composition are 5.0 mPa·s or more.

4. The ink jet recording method according to claim 1, wherein the viscosity of an equivalent liquid mixture of the reaction liquid and the white ink composition is 90 mPa's or more.

5. The ink jet recording method according to claim 1, wherein the reaction liquid further contains a surfactant having an HLB value of 10 or more.

6. The ink jet recording method according to claim 5, wherein the surfactant is a silicon-based surfactant or an acetylene-based surfactant.

7. The ink jet recording method according to claim 1, wherein the white ink composition further contains, relative to a total amount of the ink composition, 5.0% by mass or more of organic solvent having a standard boiling point of 280° C. or higher.

8. The ink jet recording method according to claim 1, wherein the fabric is a colored fabric having L* of 70 or less.

9. The ink jet recording method according to claim 1, wherein the fabric is a cotton fabric or a mixed yarn fabric containing cotton.

10. The ink jet recording method according to claim 1, wherein the fabric has fluff composed of fiber protruded from a fiber bundle constituting the fabric, and fluff having a length between a surface of the fiber bundle and a top of the fluff in a vertical direction of 50 μm or more is included.

* * * * *